(12) United States Patent
Nonoyama

(10) Patent No.: US 9,525,188 B2
(45) Date of Patent: Dec. 20, 2016

(54) CELL MODULE AND FUEL CELL STACK

(71) Applicant: TOYOTA JIDOSHA KABUSHIKI KAISHA, Toyota-shi, Aichi-ken (JP)

(72) Inventor: Nobuaki Nonoyama, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/439,348

(22) PCT Filed: Oct. 8, 2013

(86) PCT No.: PCT/JP2013/005975
§ 371 (c)(1),
(2) Date: Apr. 29, 2015

(87) PCT Pub. No.: WO2014/068854
PCT Pub. Date: May 8, 2014

(65) Prior Publication Data
US 2015/0295266 A1    Oct. 15, 2015

(30) Foreign Application Priority Data
Nov. 2, 2012    (JP) ................................. 2012-242346

(51) Int. Cl.
*H01M 2/08* (2006.01)
*H01M 8/24* (2016.01)
*H01M 8/02* (2016.01)
*H01M 8/10* (2016.01)

(52) U.S. Cl.
CPC ........... *H01M 8/242* (2013.01); *H01M 8/0202* (2013.01); *H01M 8/0273* (2013.01); *H01M 8/0297* (2013.01); *H01M 8/026* (2013.01); *H01M 8/0247* (2013.01); *H01M 2008/1095* (2013.01); *H01M 2250/10* (2013.01); *H01M 2250/20* (2013.01); *Y02E 60/50* (2013.01)

(58) Field of Classification Search
CPC .... H01M 8/026; H01M 8/242; H01M 8/0273; H01M 8/0202; H01M 8/0297; H01M 8/0247
See application file for complete search history.

(56) References Cited

U.S. PATENT DOCUMENTS

| | | | |
|---|---|---|---|
| 2009/0104503 A1* | 4/2009 | Shirahama | H01M 8/0273 429/422 |
| 2010/0279209 A1* | 11/2010 | Jeong | H01M 8/0206 429/518 |
| 2012/0156584 A1 | 6/2012 | Uehara | |
| 2012/0251918 A1 | 10/2012 | Morimoto et al. | |
| 2013/0183606 A1 | 7/2013 | Oku et al. | |

(Continued)

FOREIGN PATENT DOCUMENTS

| | | |
|---|---|---|
| CN | 102484264 A | 5/2012 |
| EP | 1087454 A1 | 3/2001 |

(Continued)

*Primary Examiner* — Jane Rhee
(74) *Attorney, Agent, or Firm* — Andrews Kurth Kenyon LLP

(57) ABSTRACT

With regard to at least one unit cell out of a plurality of unit cells, when the at least one unit cell is viewed along a stacking direction of the plurality of unit cells, at least one bonding area out of first to third bonding areas is formed at a position that does not overlap with another bonding area.

11 Claims, 9 Drawing Sheets

(56) References Cited

U.S. PATENT DOCUMENTS

2015/0072265 A1  3/2015  Ishida et al.

FOREIGN PATENT DOCUMENTS

| JP | 2007273113 A | 10/2007 |
| JP | 2010-067453 A | 3/2010 |
| JP | 2010-080222 A | 4/2010 |
| JP | 2010-272474 A | 12/2010 |
| JP | 2010-282940 A | 12/2010 |
| WO | 2010/058258 A1 | 5/2010 |
| WO | 2011-013313 A1 | 2/2011 |
| WO | 2011-114811 A1 | 9/2011 |
| WO | 2012137773 A1 | 10/2012 |
| WO | 2013140855 A1 | 9/2013 |

\* cited by examiner

CELL MODULE AND FUEL CELL STACK

CROSS-REFERENCE TO RELATED APPLICATIONS

This is a national phase application based on the PCT International Patent Application No. PCT/JP2013/005975 filed Oct. 8, 2013, claiming priority to Japanese Patent Application No. 2012-242346 filed Nov. 2, 2012, the entire contents of both of which are incorporated herein by reference.

TECHNICAL FIELD

The present invention relates to a cell module.

BACKGROUND ART

A known technique forms one cell module by stacking a plurality of cells (for example, Patent Literatures 1 to 4). A fuel cell stack is formed by stacking a plurality of such cell modules and applying a predetermined load from both sides in the stacking direction of the plurality of stacked cell modules.

CITATION LIST

Patent Literature

PTL 1: JP-A-2010-282940
PTL 2: JP-A-2010-080222
PTL 3: JP-A-2010-067453
PTL 4: JP-A-2010-272474

SUMMARY

Technical Problem

Each cell constituting a cell module includes a membrane electrode and gas diffusion layer assembly (also called "electrode body"), a pair of separators and a frame member such as gasket. The electrode body has a membrane electrode assembly and a pair of gas diffusion layers. The pair of separators are placed to have the electrode body placed therebetween. The frame member serves to provide insulation between the separators and is placed around an outer periphery of the electrode body to prevent leakage of a fluid such as a reactive gas to outside.

The following problems may arise when a fuel cell stack is produced by stacking a plurality of such cell modules and placing end plates on each side of the stacked cell modules. The gas diffusion layers included in each cell of the cell module are designed to have a relatively large thickness. The frame member is fixed to the outer periphery of the gas diffusion layers. Each cell module prior to being placed between the end plates as the fuel cell stack is likely to be deformed in a drum-like shape or more specifically to be expanded outward in a center area where the gas diffusion layers are located. Excessive deformation of the cell module in the drum-like shape may cause various problems. For example, this may deteriorate the sealing performance of the cell module. This may also cause a crack in each component of the cell module by, for example, stress concentration.

Patent Literatures 1 to 3 disclose the techniques of reducing the likelihood of the problems caused by deformation of the cell module. For example, in the technique of Patent Literature 1, a non-bonding area where the gasket is not bonded to the separator is provided on a contact surface where the gasket is in contact with the separator. This improves the followability of gasket deformation. The technique of Patent Literature 1, however, requires an elastic member, for example, rubber as the sealing member. Molding rubber requires a long time under a high temperature environment. This is likely to increase the manufacturing cost of the cell module. In application using thick rubber as the sealing member, the cell module may have a soft configuration and may cause a deviation from the designed location or a twist in the course of stacking a plurality of cell modules. The technique of Patent Literature 2 uses an elastic member for the gasket and may thus cause the similar problems to those of Patent Literature 1 described above.

In the techniques of Patent Literatures 3 and 4, rubber is provided to change the interval between adjacent separators. These techniques, however, need rubber as an additional component and are likely to increase the manufacturing cost of the cell module or the fuel cell stack. In the technique of Patent Literature 3, a gasket placed around an outer periphery of an electrode body is bonded to a separator. The interval between adjacent separators is thus likely to be limited by the stretch of the gasket.

In the cell module integrated by stacking a plurality of unit cells as described above, there is a need to suppress the cell module from being excessively deformed in a drum-like shape by the simple configuration. With respect to the cell module, other needs include resource saving, easy manufacture and improvement of usability.

Solution to Problem

In order to solve at least part of the problems described above, the invention may be implemented by the following aspects.

(1) According to one aspect of the invention, there is provided a cell module. The cell module comprises a plurality of unit cells that are stacked. The unit cell comprises: an electrode body including a membrane electrode assembly and a pair of gas diffusion layers placed on each surface of the membrane electrode assembly; a frame placed along an outer periphery of the electrode body to surround the electrode body; a first separator and a second separator bonded to the frame such as to have the electrode body and the frame placed therebetween, wherein the first separator is located on one side of the membrane electrode assembly and the second separator is located on the other side of the membrane electrode assembly; and a first bonding area provided as an area where the first separator and the frame are bonded to each other, a second bonding area provided as an area where the second separator and the frame are bonded to each other and a third bonding area provided as an area where separators included in adjacent unit cells are bonded to each other. With respect to at least one unit cell out of the plurality of unit cells, when the at least one unit cell is viewed along a stacking direction of the plurality of unit cells, at least one bonding area out of the first to the third bonding areas of the unit cell is formed at a position that does not overlap with another bonding area of the unit cell. The cell module of this aspect enables part of the separator or the frame to be bowed and bent in the stacking direction, even when a force is applied to the cell module in a direction of expanding the gas diffusion layers. This enables a peripheral area where the frame is located to be deformed associated with deformation of a center area where the gas diffusion layers are located. The simple configuration that at least one bonding area out of the first to the third bonding areas is formed at a position that does not overlap with the position of another bonding area suppresses the cell module from being excessively deformed in a drum-like shape.

(2) In the cell module of the above aspect, the at least one unit cell may have a first bonding pattern. In the first bonding pattern, when the at least one unit cell is viewed along the stacking direction, the first bonding area and the second bonding area may be formed at positions that do not overlap with each other. In the cell module of this aspect, part of the frame may be bowed and bent in the stacking direction in an area where the first bonding pattern is formed.

(3) In the cell module of the above aspect, the at least one unit cell may have a second bonding pattern. In the second bonding pattern, when the at least one unit cell is viewed along the stacking direction, with respect to at least one of the first and the second separators, the third bonding area formed on one surface may be arranged at a position that does not overlap with either the first bonding area or the second bonding area formed on the other surface. In the cell module of this aspect, part of the separator may be bowed and bent in the stacking direction in an area where the second bonding pattern is formed.

The cell module may have only one of the first and the second bonding patterns or may have both the first and the second bonding patterns.

(4) In the cell module of the above aspect, the first separator and the second separator may be metal plates. In the cell module of this aspect, the first and the second separators may be readily bendable.

(5) In the cell module of the above aspect, the first separator and the second separator may be members including carbon particles and a resin. In the cell module of this aspect, the first and the second separators may be formed from the members including carbon particles.

(6) According to another aspect of the invention, there is provided a fuel cell stack. The fuel cell stack comprises a plurality of the cell modules of any of the above aspects, and the plurality of the cell modules are stacked in the stacking direction. This aspect provides the fuel cell stack including the cell module configured to suppress excessive deformation in a drum-like shape.

The invention may be implemented by any of various aspects other than those described above: for example, a manufacturing method of the cell module, a manufacturing method of the fuel cell stack or a vehicle equipped with the fuel cell stack including the cell module.

DESCRIPTION OF EMBODIMENTS

Embodiments of the invention are described in the following sequence:

A to D: Various Embodiments
E. Modifications

A. First Embodiment

A-1. Configuration of Fuel Cell System 5

Figure 1:
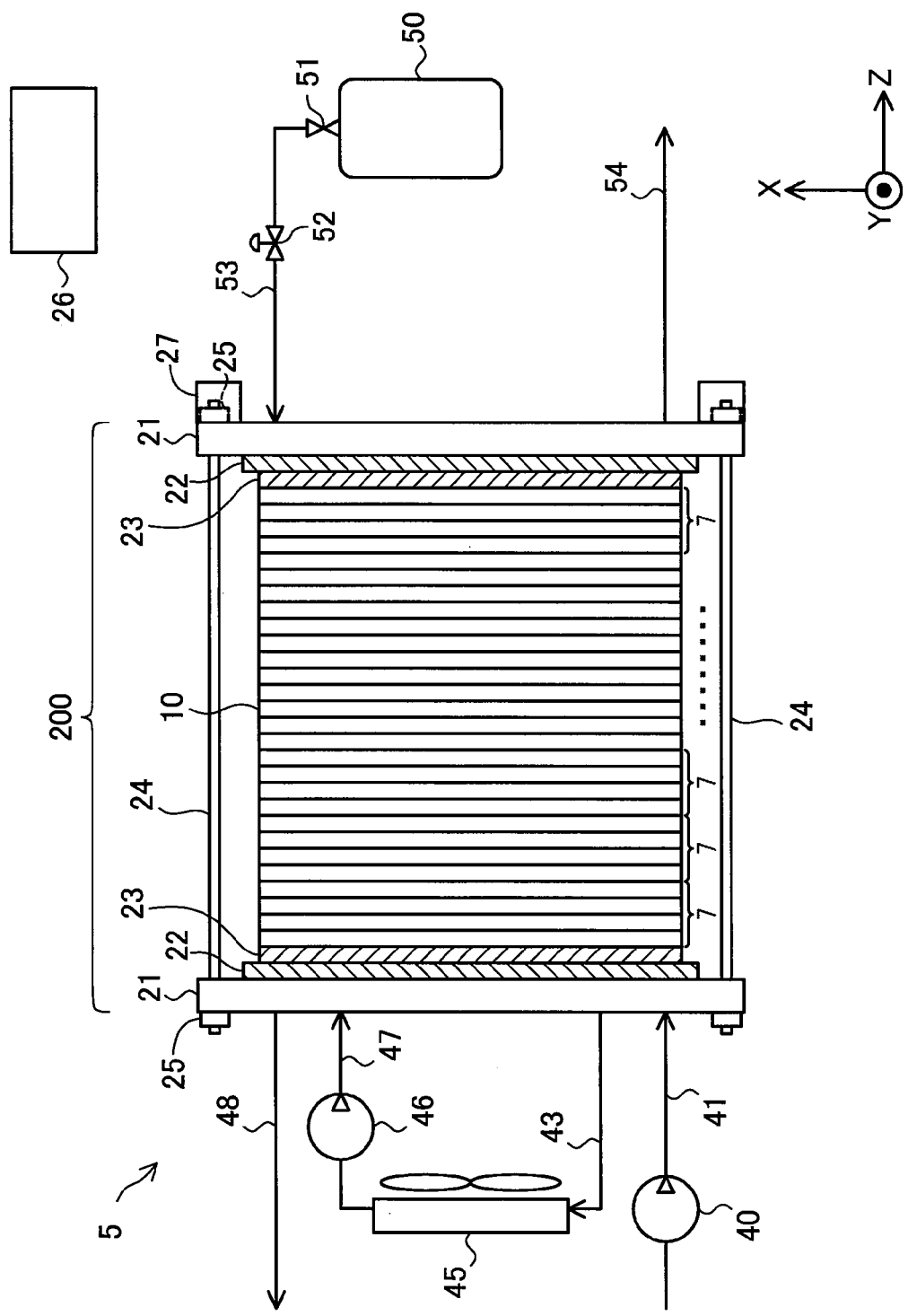
FIG. 1 is a diagram illustrating the general configuration of a fuel cell system according to a first embodiment.

FIG. 1 is a diagram illustrating the general configuration of a fuel cell system 5 according to a first embodiment. The fuel cell system 5 includes a fuel cell stack 200, a hydrogen tank 50 provided to store hydrogen that is to be supplied to the fuel cell stack 200, an air compressor 40 provided to supply the compressed air to the fuel cell stack 200 and a controller 26 configured to control the entire fuel cell system 5.

The fuel cell stack 200 includes a plurality of cell modules 7, end plates 21, insulating plates 22 and current collectors 23. In each of the cell modules 7, a plurality of unit cells 10 are stacked, such that adjacent unit cells 10 are bonded to each other. In the cell module 7, ten to fifty unit cells 10 are stacked. The current collectors 23, the insulating plates 22 and the end plates 21 are arranged in this sequence outward from the cell module 7-side on both sides in the stacking direction (Z-axis direction). The inside between the two end plates 21 is fastened by a predetermined fastening power using tension rods 24 and nuts 25. A specified load is accordingly applied from both sides in the stacking direction to each of the cell modules 7. An actuator 27 is provided on at least one of the nuts 25 to rotate the nut 25 and adjust the fastening power.

The unit cell 10 individually serves as a fuel cell to generate electric power. Any of various types of fuel cells may be employed for the unit cell 10. This embodiment uses a solid electrolyte fuel cell for the unit cell 10. The unit cell 10 generates electric power by electrochemical reaction of a fuel gas (hydrogen) and an oxidizing gas (oxygen included in the air). According to this embodiment, the respective unit cells 10 have identical structures and specifications. The specific structures of the unit cell 10 and the cell module 7 will be described later.

Hydrogen as the fuel gas stored in the hydrogen tank 50 is subjected to pressure reduction using a pressure reducing valve 51 and is then flowed through a hydrogen gas supply path 53. The flow of hydrogen is adjusted to have a predetermined pressure by a pressure regulator 52 provided in the hydrogen gas supply path 53 and is supplied to the fuel cell stack 200. A hydrogen-containing gas (anode feed gas) supplied to the fuel cell stack 200 is supplied via an anode gas supply manifold (not shown) provided inside of the fuel cell stack 200 to the respective unit cells 10 and is used for power generation in the respective unit cells 10. A gas containing hydrogen unused in the respective unit cells 10 (anode off gas) is collected via an anode gas exhaust manifold (not shown) provided inside of the fuel cell stack 200. The anode off gas is then discharged out of the fuel cell stack 200 via an anode off gas passage 54. The fuel cell system 5 may be configured to recirculate the anode off gas to the supply side.

The air compressor 40 serves to pressurize the air taken in from the outside as the oxidizing gas. The pressurized air is supplied via an oxidizing gas supply path 41 to the fuel cell stack 200. The oxygen-containing air (cathode feed gas) supplied to the fuel cell stack 200 is supplied via a cathode gas supply manifold (not shown) to the respective unit cells 10 and is used for power generation in the respective unit cells 10. The air unused in the respective cells 10 (cathode off gas) is collected via a cathode gas exhaust manifold (not shown) and is discharged out of the fuel cell stack 200 via a cathode off gas passage 48.

A cooling medium circulation pump 46 serves to supply a cooling medium via a cooling medium circulation path 47 to the fuel cell stack 200. The cooling medium warmed by the fuel cell stack 200 is cooled down by a radiator 45 and is supplied again to the fuel cell stack 200. The cooling medium is supplied via a cooling medium supply manifold (not shown) to the respective unit cells 10 to cool down the respective unit cells 10. After passing through the respective unit cells 10, the cooling medium is collected via a cooling medium exhaust manifold (not shown) and is flowed through a cooling medium circulation path 43 into the radiator 45. The cooling medium may be water or an antifreeze liquid such as mixed liquid of water and ethylene glycol. This embodiment uses a liquid as the cooling medium, but the air may alternatively be used as the cooling medium.

The controller 26 is a computer including a CPU and memories (not shown). The controller 26 receives signals from, for example, temperature sensors, pressure sensors and voltmeters located in the respective parts of the fuel cell system 5 and controls the entire fuel cell system 5 based on the received signals.

A-2. Structure of Cell Module 7

Figure 2:
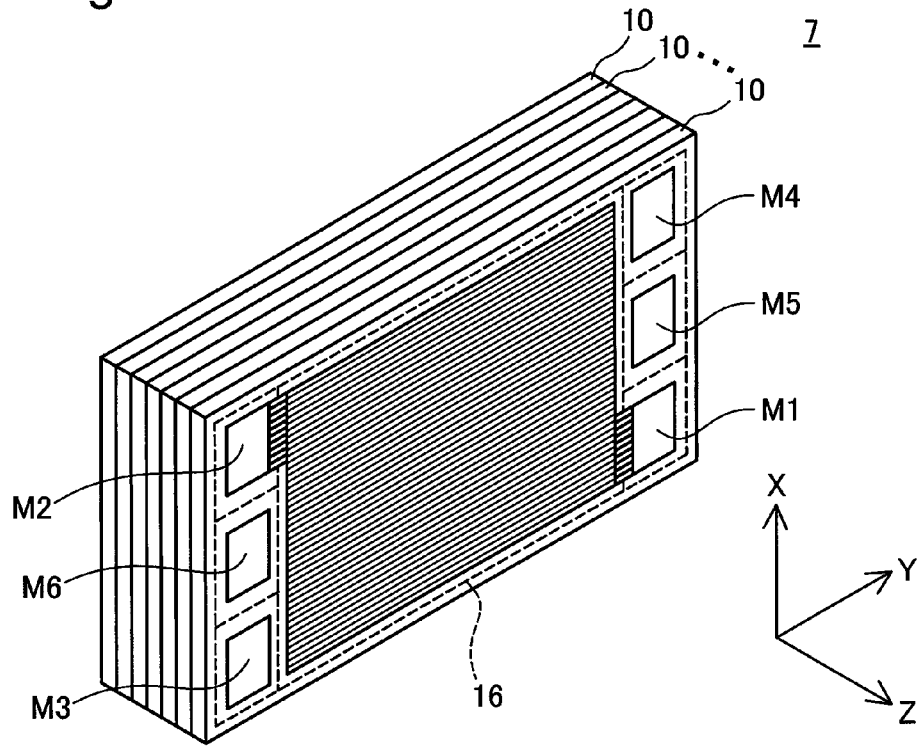
FIG. 2 is a perspective view illustrating a cell module.
Figure 3:
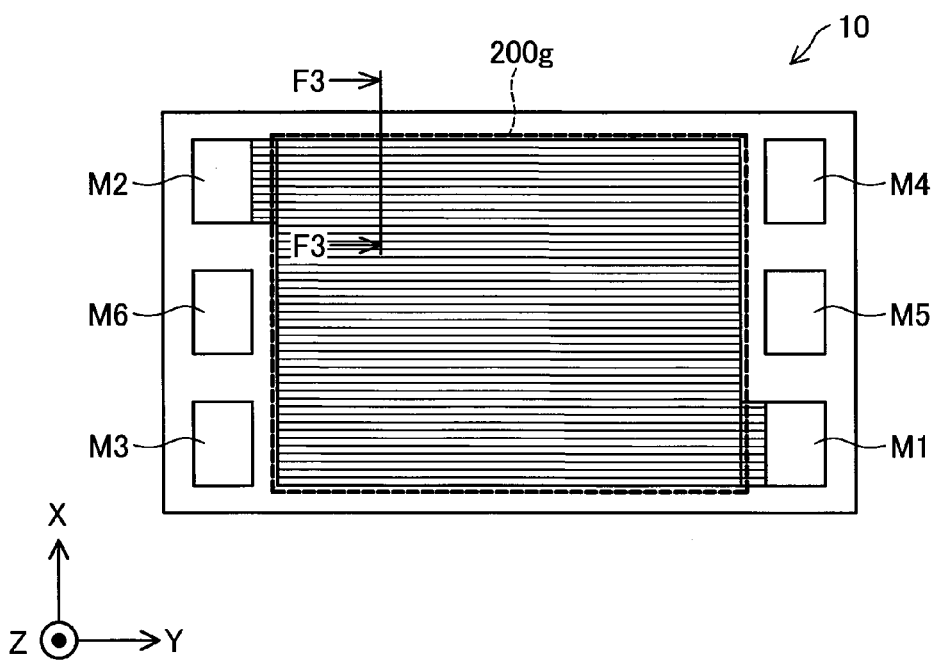
FIG. 3 is a front view illustrating the cell module.

FIG. 2 is a perspective view illustrating the cell module 7. FIG. 3 is a front view illustrating the cell module 7. The cell module 7 is formed by stacking a plurality of the unit cells 10 and bonding adjacent unit cells 10 to each other. The adjacent unit cells 10 may be bonded to each other, for example, by using an adhesive. The cell module 7 has manifolds M1 to M6 which the reactive gases (fuel gas and oxidizing gas) and the cooling medium are flowed through in the stacking direction (Z-axis direction). More specifically, the anode feed gas (hydrogen) is flowed through the manifold M1. The anode off gas is flowed through the manifold M2. The cathode feed gas (air) is flowed through the manifold M3. The cathode off gas is flowed through the manifold M4. The cooling medium supplied from outside is flowed through the manifold M5. The cooling medium passing through the unit cell 10 is flowed through the manifold M6. As shown in FIG. 3, a power generation area 200g is formed in an inner area surrounded by the respective manifolds M1 to M6.

The unit cell 10 has a bonding area where a first separator and a resin frame are bonded to each other, a bonding area where a second separator and the resin frame are bonded and a bonding area where adjacent unit cells 10 are bonded to each other, as described in detail later. These three bonding areas are formed such as to surround the power generation area 200g and to surround through holes constituting the respective manifolds M1 to M6.

In the fuel cell stack 200 formed by stacking a plurality of the cell modules 7, a gasket 16 is placed between adjacent cell modules 7. Placing the gasket 16 to be in close contact with the two adjacent cell modules 7 prevents leakage of the reactive gases and the cooling medium to outside.

A-3. Structure of Unit Cell 10

Figure 4:
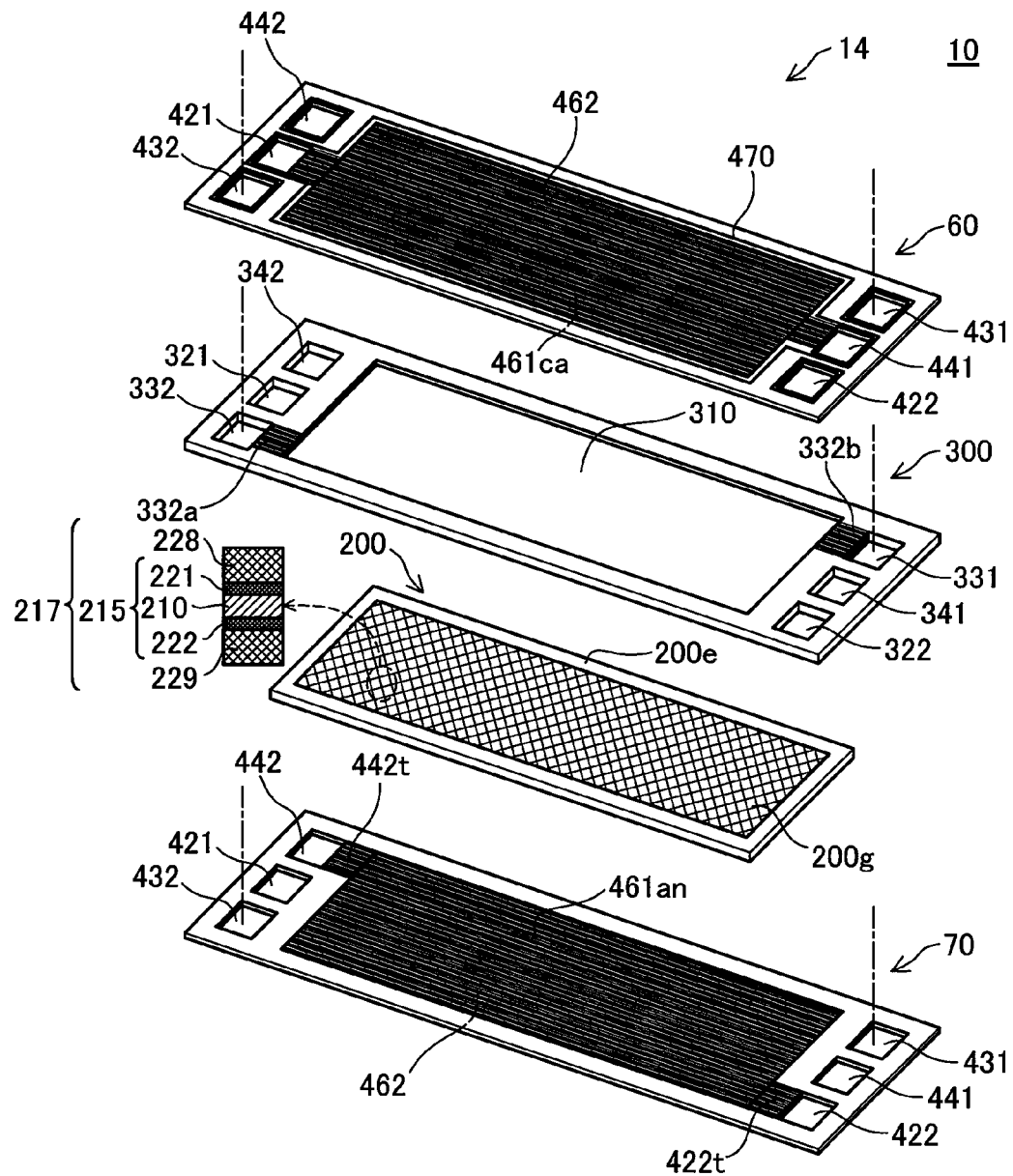
FIG. 4 is an exploded perspective view illustrating a unit cell.

FIG. 4 is an exploded perspective view illustrating the unit cell 10. The unit cell 10 includes an electrode body 217, a resin frame 300, a first separator 60 and a second separator 70. The electrode body 217 forms the power generation area 200g. The electrode body 217 includes a membrane electrode assembly 215 and a pair of gas diffusion layers 228 and 229 arranged to have respective surfaces of the membrane electrode assembly 215 placed therebetween.

The membrane electrode assembly 215 includes an electrolyte membrane 210 and a pair of catalyst electrode layers 221 and 222 arranged to have respective surfaces of the electrolyte membrane 210 placed therebetween. The electrolyte membrane 210 is a polymer electrolyte membrane made of a fluorinated sulfonic acid polymer as the solid polymer material and has good proton conductivity in the wet state. The electrolyte membrane 210 is not limited to the fluorinated sulfonic acid membrane but may be a fluorinated phosphonic acid membrane, a fluorinated carboxylic acid membrane, a fluorinated hydrocarbon graft membrane, a hydrocarbon graft membrane or an aromatic membrane.

The catalyst electrode layers 221 and 222 are also called cathode 221 and anode 222. For example, each of the catalyst electrode layers 221 and 222 may be arranged to include a catalyst-supporting carrier (for example, carbon particles) having a catalyst metal (for example, platinum) for accelerating the electrochemical reaction supported thereon, and a polymer electrolyte (for example, fluororesin) having proton conductivity. The catalyst-supporting carrier is not limited to the carbon particles but may be a carbon material such as carbon black, carbon nanotube or carbon nanofiber or a carbon compound such as silicon carbide. The catalyst metal is not limited to platinum but may be a platinum alloy, palladium, rhodium, gold silver, osmium or iridium.

The pair of gas diffusion layers 228 and 229 are also called cathode diffusion layer 228 and anode diffusion layer 229. The gas diffusion layers 228 and 229 are layers arranged to diffuse the reactive gases used for the electrode reactions along the planar direction of the electrolyte membrane 210 and are made of a porous gas diffusion layer material. The gas diffusion layer material may be, for example, a carbon porous body such as carbon paper or carbon cloth or a metal porous body such as metal mesh or metal foam.

The resin frame 300 is attached to an outer periphery 200e of the electrode body 217. The resin frame 300 is placed between the pair of separators 60 and 70 to prevent a short circuit between the separators 60 and 70 and leakage of a fluid such as the reactive gas passing through inside of the cell module 7 to outside. The resin frame 300 is made of polypropylene. The resin frame 300 is in a sheet-like form. The resin frame 300 may alternatively be made of another resin such as a phenolic resin or an epoxy resin.

The resin frame 300 has a rectangular outer shape and has an opening 310 formed in a center area to receive the electrode body 217 therein. The resin frame 300 has through holes 321, 322, 331, 332, 341 and 342 which respectively constitute parts of the manifolds M1 to M6 and are formed around the opening 310 of the resin frame 300. More specifically, the through hole 322 constitutes part of the manifold M1, and the through hole 342 constitutes part of the manifold M2. The through hole 332 constitutes part of the manifold M3, and the through hole 331 constitutes part of the manifold M4. The through hole 341 constitutes part of the manifold M5, and the through hole 321 constitutes part of the manifold M6.

The resin frame 300 has groove paths 332a and 332b formed on a surface of the resin frame 300 opposed to the first separator 60. The groove path 332a is extended from the through hole 332 to the opening 310. The groove path 332a is provided as a flow path which the oxidizing gas flowing through the manifold M3 is flowed through to the electrode body 217. The groove path 332b is extended from the through hole 331 to the opening 310. The groove path 332b is provided as a flow path which the cathode off gas passing through the electrode body 217 is flowed through to the manifold M4. The resin frame 300 also has a first groove path (not shown) formed to extend from the through hole 322 to the opening 310 and a second groove path (not shown) formed to extend from the through hole 342 to the opening 310, on a surface of the resin frame 300 opposed to the second separator 70. The first groove path is provided as a flow path which the fuel gas flowing through the manifold M1 is flowed through to the electrode body 217. The second groove path is provided as a flow path which the fuel gas passing through the electrode body 217 is flowed through to the manifold M2. The groove paths 332a and 332b as well as the first groove path and the second groove path may be omitted appropriately.

The first separator 60 and the second separator 70 are arranged to have the electrode body 217 and the resin frame 300 placed therebetween. The first separator 60 and the second separator 70 are bonded to the resin frame 300 using, for example, an adhesive. The first separator 60 is located on the cathode 221-side as one side of the membrane electrode assembly 215, and the second separator 70 is located on the anode 222-side as the other side of the membrane electrode assembly 215.

The first and the second separators 60 and 70 are made of a material having gas cutoff performance and electrical conductivity. The first and the second separators 60 and 70 may be made of a carbon material such as dense carbon produced by compressing carbon particles to be gas impermeable or a metal material such as press-formed stainless steel.

Each of the first and the second separators 60 and 70 has through holes 421, 422, 431, 432, 441 and 442 respectively constituting parts of the manifolds M1 to M6. More specifically, the through hole 422 constitutes part of the manifold M1, and the through hole 442 constitutes part of the manifold M2. The through hole 432 constitutes part of the manifold M3, and the through hole 431 constitutes part of the manifold M4. The through hole 441 constitutes part of the manifold M5, and the through hole 421 constitutes part of the manifold M6.

The first separator 60 has a groove path 461Ca formed on a surface of the first separator 60 opposed to the electrode body 217. The groove path 461Ca communicates with the manifolds M3 and M4 to supply the oxidizing gas flowing through the manifold M3 to the cathode 221 of the electrode body 217 and make the cathode off gas passing through the electrode body 217 flow through to the manifold M4. The groove path 461Ca communicates with the manifold M3 via the groove path 332a and a groove path (not shown) formed in the separator 60. The groove path 461Ca communicates with the manifold M4 via the groove path 332b and a groove path (not shown) formed in the separator 60. The first separator 60 also has a groove path 462 formed on an opposite surface of the first separator 60 located on the opposite side to the surface opposed to the electrode body 217. The groove path 462 communicates with the manifolds M5 and M6 to make the cooling medium flow through.

The second separator 70 has a groove path 461an formed on a surface of the second separator 70 opposed to the electrode body 217. The groove path 461an communicates with the manifolds M1 and M2 to supply the fuel gas flowing through the manifold M1 to the anode 222 of the electrode body 217 and make the anode off gas passing through the electrode body 218 flow through to the manifold M2. The groove path 461an communicates with the manifold M1 via a groove path 422t formed in the separator 70 and a groove path (not shown) formed in the resin frame 300. The groove path 461an communicates with the manifold M2 via a groove path 442t formed in the separator 70 and a groove path (not shown) formed in the resin frame 300. The second separator 70 also has a groove path 462 formed on an opposite surface of the second separator 70 located on the opposite side to the surface opposed to the electrode body 217. The groove path 462 communicates with the manifolds M5 and M6 to make the cooling medium flow through.

Each of the first and the second separators 60 and 70 may be provided as a separator of three-layered structure. The separator of three-layered structure may be formed from, for example, three metal plates. An intermediate plate has a flow path arranged to make a flow of the cooling medium. Two separator plates placed across the intermediate plate respectively have an opening arranged to make a flow of the reactive gas to the electrode body 217 and an opening arranged to make a flow of the reactive gas passing through the electrode body 217 to the manifold. The separator of three-layered structure also has through holes respectively constituting parts of the manifolds M1 to M6.

A-4. Description of Bonding Patterns and their Advantageous Effects

A-4-1. Predetermined Bonding Pattern

Figure 5:
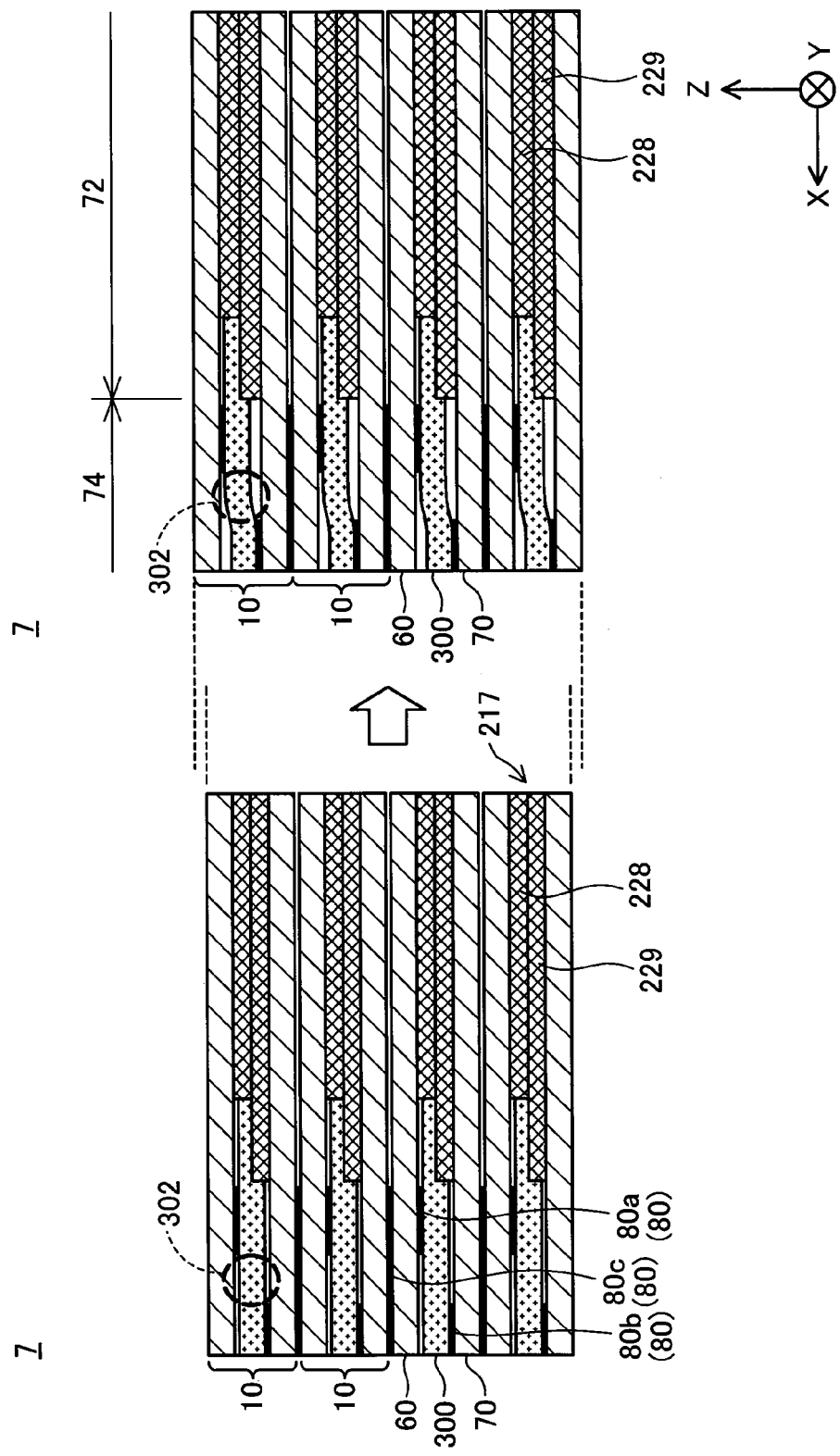
FIG. 5 is diagrams illustrating a first bonding pattern and its advantageous effects.

The following describes the positional relationship of bonding areas 80 in which the respective components are bonded to each other in the above cell module 7. FIG. 5 is diagrams illustrating a bonding pattern and its advantageous effects. The two diagrams of FIG. 5 show part of the cell module 7 taken on a plane parallel to the stacking direction (Z-axis direction) and are F3-F3 cross sectional views of FIG. 3. The diagram on the left side of FIG. 5 (left diagram) illustrates the state that the cell module 7 is integrated in the fuel cell stack 200 and a predetermined load is applied to the cell module 7 from both sides in the stacking direction. The diagram on the right side of FIG. 5 (right diagram) illustrates the state that the predetermined load is not applied to the cell module 7. The cross sectional views of FIG. 5 are given with a view to describing the bonding pattern in detail and may be applied to not only the cell module including the separators 60 and 70 of the above embodiment but a cell module including various separators other than the separators 60 and 70 of the above embodiment. The description below is on the assumption of the simplified structure of the separators 60 and 70 and the electrode body 217, in order to focus on the description of the bonding pattern.

The bonding area 80 in which the first separator 60 and the resin frame 300 are bonded to each other is called first bonding area 80a. The bonding area 80 in which the second separator 60 and the resin frame 300 are bonded to each other is called second bonding area 80b. The bonding area 80 in which the separators 60 and 70 of the adjacent unit cells are bonded to each other is called third bonding area 80c. Each of the plurality of unit cells 10 constituting the cell module 7 has one first bonding area 80a, one second bonding area 80b and two third bonding areas 80c. The first, the second and the third bonding areas 80a, 80b and 80c are formed to surround the power generation area 200g (shown in FIG. 3) and to surround the through holes constituting the respective manifolds M1 to M6 (shown in FIG. 3), in order to prevent leakage of a fluid such as the reactive gas from the inside of the cell module 7.

The first to the third bonding areas 80a to 80c included in at least one unit cell 10 out of the plurality of unit cells 10 may have the following pattern (called "predetermined bonding pattern"). When the object unit cell 10 is viewed along the stacking direction (Z-axis direction) of the plurality of unit cells 10, the predetermined bonding pattern is that at least one bonding area of the first to the third bonding areas 80a to 80c is formed at a position that does not overlap with the positions of the other bonding areas.

A-4-2. First Bonding Pattern and its Advantageous Effects

In the illustrated example of FIG. 5, the respective unit cells 10 of the cell module 7 have a first bonding pattern of the predetermined bonding pattern. The first bonding pattern denotes a pattern in which the first bonding area 80a and the second bonding area 80b are formed at the positions that do not overlap with each other when the object unit cell 10 is viewed along the stacking direction (Z-axis direction). In the example of FIG. 5, the third bonding area 80c is formed at a position that overlaps with the positions of both the first and the second bonding areas 80a and 80b. The first bonding area 80a and the second bonding area 80b are formed, on the other hand, at the positions that do not overlap with each other but are shifted from each other. When the unit cell 10 has the first bonding pattern, the resin frame 300 has a deformation area 302. The deformation area 302 denotes a deformable area in which the separators 60 and 70 are not bonded to either of the two principal surfaces of the resin frame 300.

As shown in the right diagram of FIG. 5, when the cell module 7 is in no loading state, the thicknesses of the gas diffusion layers 228 and 229 of the electrode body 217 increase to expand a center area 72 of the cell module 7 outward along the stacking direction. Accordingly, this increases the thickness (length along the stacking direction) of the center area 72 of the cell module 7. Part of a peripheral area 74 where the deformation area 302 of the resin frame 300 is located has a bowed and bent shape. The shape of the resin frame 300 is changed between the state that a compressive load is applied in the stacking direction and the state that the compressive load is released as described above, so that the thickness of the peripheral area 74 is increased with an increase in thickness of the center area 72. This suppresses the cell module 7 from being excessively deformed in a drum-like shape. This results in reducing the likelihood of a damage such as cracking of the cell module 7 by, for example, stress concentration.

A-4-3. Second Bonding Pattern and its Advantageous Effects

Figure 6:
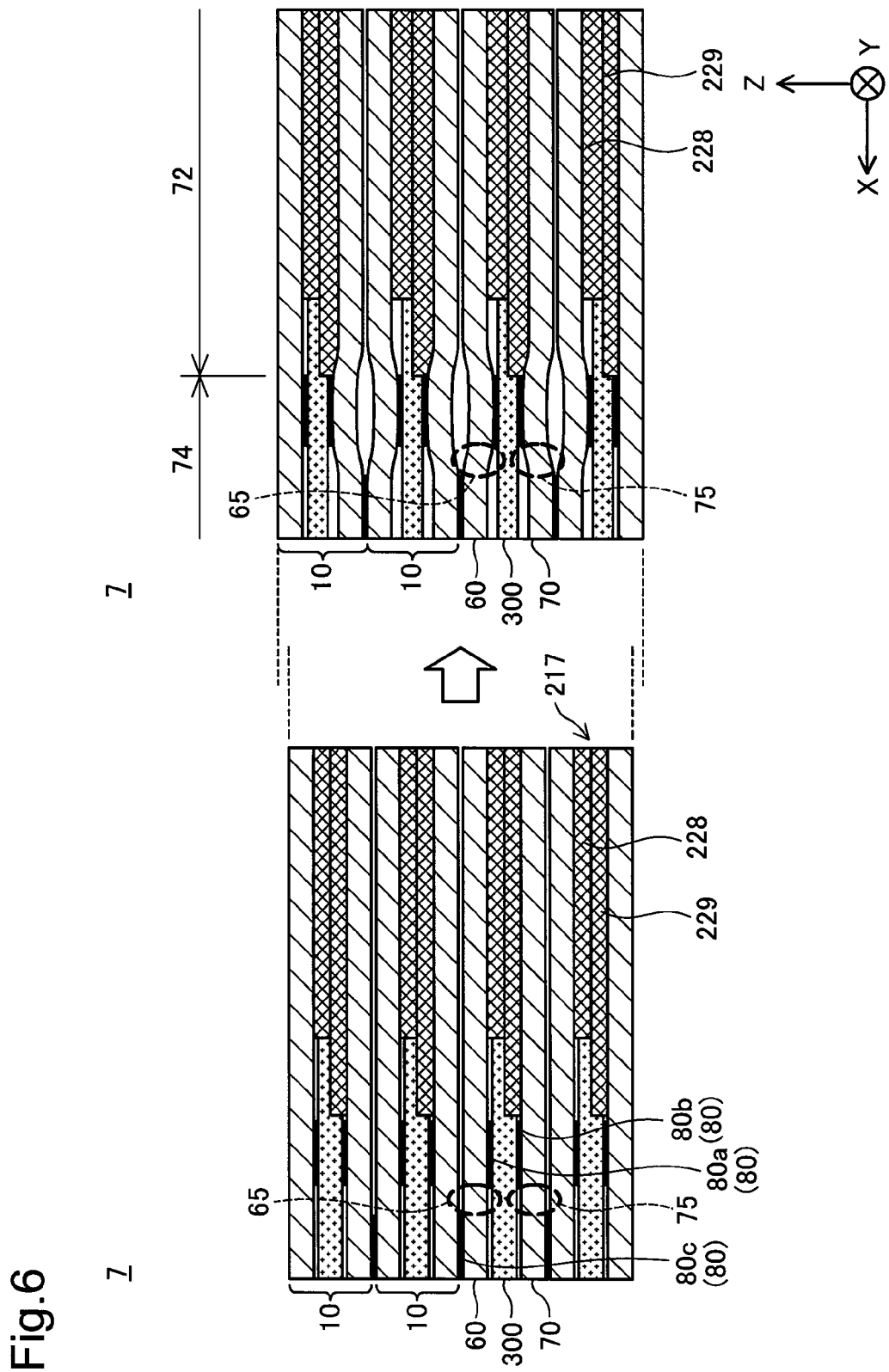
FIG. 6 is diagrams illustrating a second bonding pattern and its advantageous effects.

FIG. 6 is diagrams illustrating a second bonding pattern and its advantageous effects. The two diagrams of FIG. 6 show part of the cell module 7 taken on the plane parallel to the stacking direction (Z-axis direction) and are F3-F3 cross sectional views of FIG. 3. The left diagram of FIG. 6 corresponds to the left diagram of FIG. 5, and the right diagram of FIG. 6 corresponds to the right diagram of FIG. 5. The cross sectional views of FIG. 6 are given with a view to describing the bonding pattern in detail and may be applied to not only the cell module including the separators 60 and 70 of the above embodiment but a cell module including various separators other than the separators 60 and 70 of the above embodiment. The description below is on the assumption of the simplified structure of the separators 60 and 70 and the electrode body 217, in order to focus on the description of the bonding pattern.

The respective unit cells 10 of the cell module 7 may have a second bonding pattern of the predetermined bonding pattern. In the second bonding pattern, when the unit cell 10 is viewed along the stacking direction (Z-axis direction), with respect to at least one of the first and the second separators 60 and 70, the third bonding area 80c formed on one surface is arranged at a position that does not overlap with but is shifted from the position of either the first bonding area 80a or the second bonding area 80b formed on the other surface.

In the illustrated example of FIG. 6, the description is focused on the first separator 60 out of the first and the second separators 60 and 70 included in the unit cell 10. Bonding areas formed on the first separator 60 are the first bonding area 80a and the third bonding area 80c. In the second bonding pattern, the first bonding area 80a and the third bonding area 80c formed on the first separator 60 are arranged at positions that do not overlap with each other but are shifted from each other. When the description is focused on the second separator 70, bonding areas formed on the second separator 70 are the second bonding area 80b and the third bonding area 80c. In the second bonding pattern, the second bonding area 80b and the third bonding area 80c formed on the second separator 70 are arranged at positions that do not overlap with each other but are shifted from each other. In the illustrated example of FIG. 6, when the unit cell 10 is viewed along the stacking direction (Z-axis direction), the first and the second bonding areas 80a and 80b are formed at positions that overlap with each other, and the third bonding area 80c is formed at a position that overlaps with neither of the positions of the first and the second bonding areas 80a and 80b but is shifted from the positions of the first and the second bonding areas 80a and 80b.

As described above, when the unit cell 10 has the second bonding pattern, the first and the second separators 60 and 70 have deformation areas 65 and 75. The deformation areas 65 and 75 denote deformable areas in which no bonding area is formed on either of the two primary surfaces with respect to each of the separators 60 and 70.

As shown in the right diagram of FIG. 6, when the cell module 7 is in no loading state, the center area 72 of the cell module 7 expands outward along the stacking direction. This results in increasing the thickness of the center area 72 of the cell module 7. Part of the peripheral area 74 where the deformation area 65 of the first separator 60 is located and part of the peripheral area 74 where the deformation area 75 of the second separator 70 is located have bowed and bent shapes in the stacking direction. The shapes of the first and the second separators 60 and 70 are changed between the state that a compressive load is applied in the stacking direction and the state that the compressive load is released as described above, so that the thickness of the peripheral area 74 is increased with an increase in thickness of the center area 72. This suppresses the cell module 7 from being excessively deformed in a drum-like shape. This results in reducing the likelihood of a damage such as cracking of the cell module 7 by, for example, stress concentration.

A-5. Comparative Example

Figure 7:
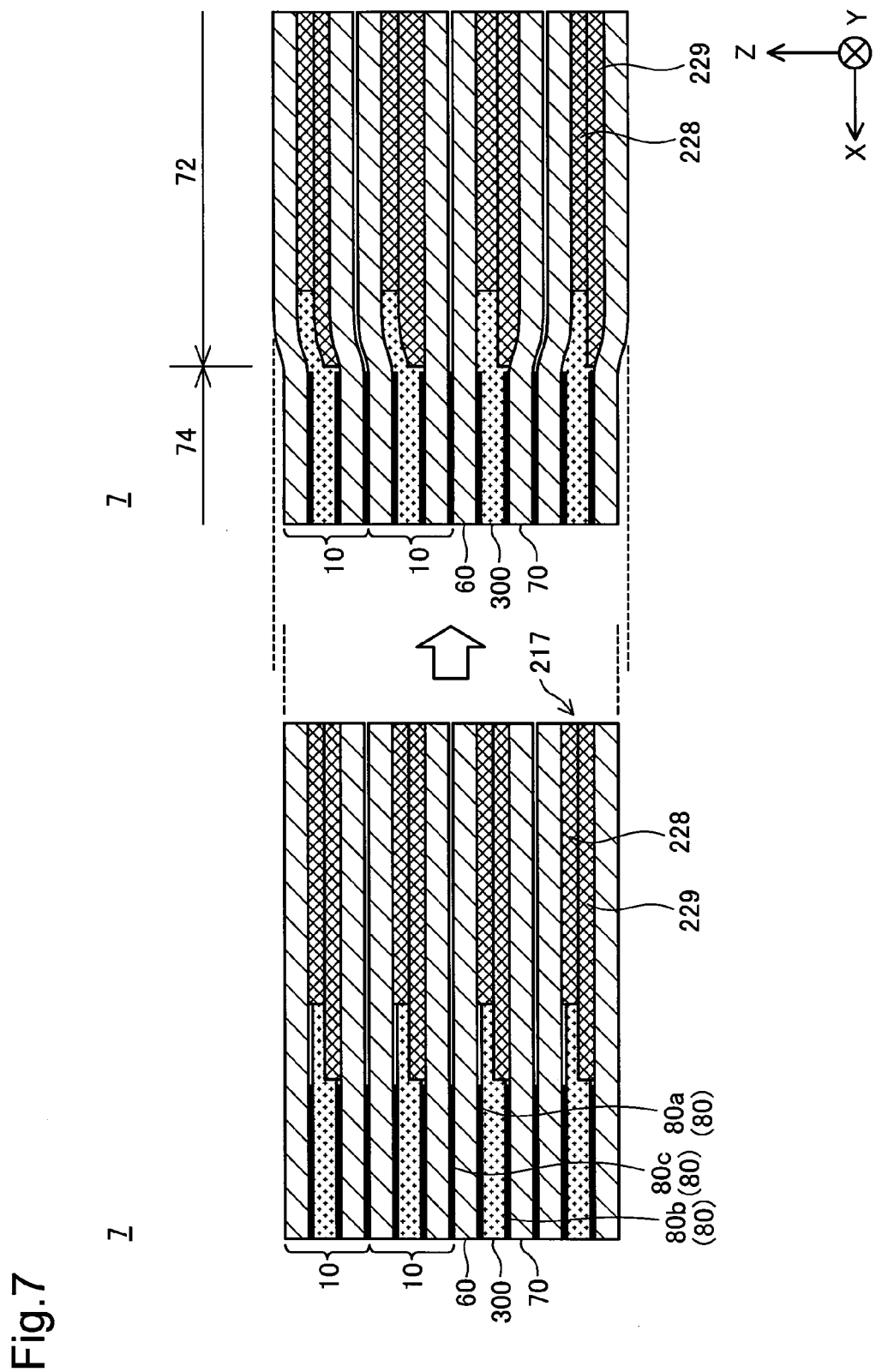
FIG. 7 is diagrams illustrating a comparative example.

FIG. 7 is diagrams illustrating a comparative example. In a bonding pattern shown in FIG. 7, when a cell module 7 is viewed along the stacking direction (Z-axis direction) of the unit cells 10, all first to third bonding areas 80a to 80c of the cell module 7 are formed at positions that do not overlap with one another. As shown in the right diagram of FIG. 7, when the cell module 7 is in no loading state, the thickness of the center area 72 increases. The peripheral area 74 where the resin frame 300 is located, on the other hand, does not follow deformation of the center area 72, since neither of the resin frame 300, the first separator 60 and the second separator 70 is deformable in the thickness direction. The cell module 7 is thus likely to be excessively deformed in a drum-like shape.

B. Second Embodiment

Figure 8:
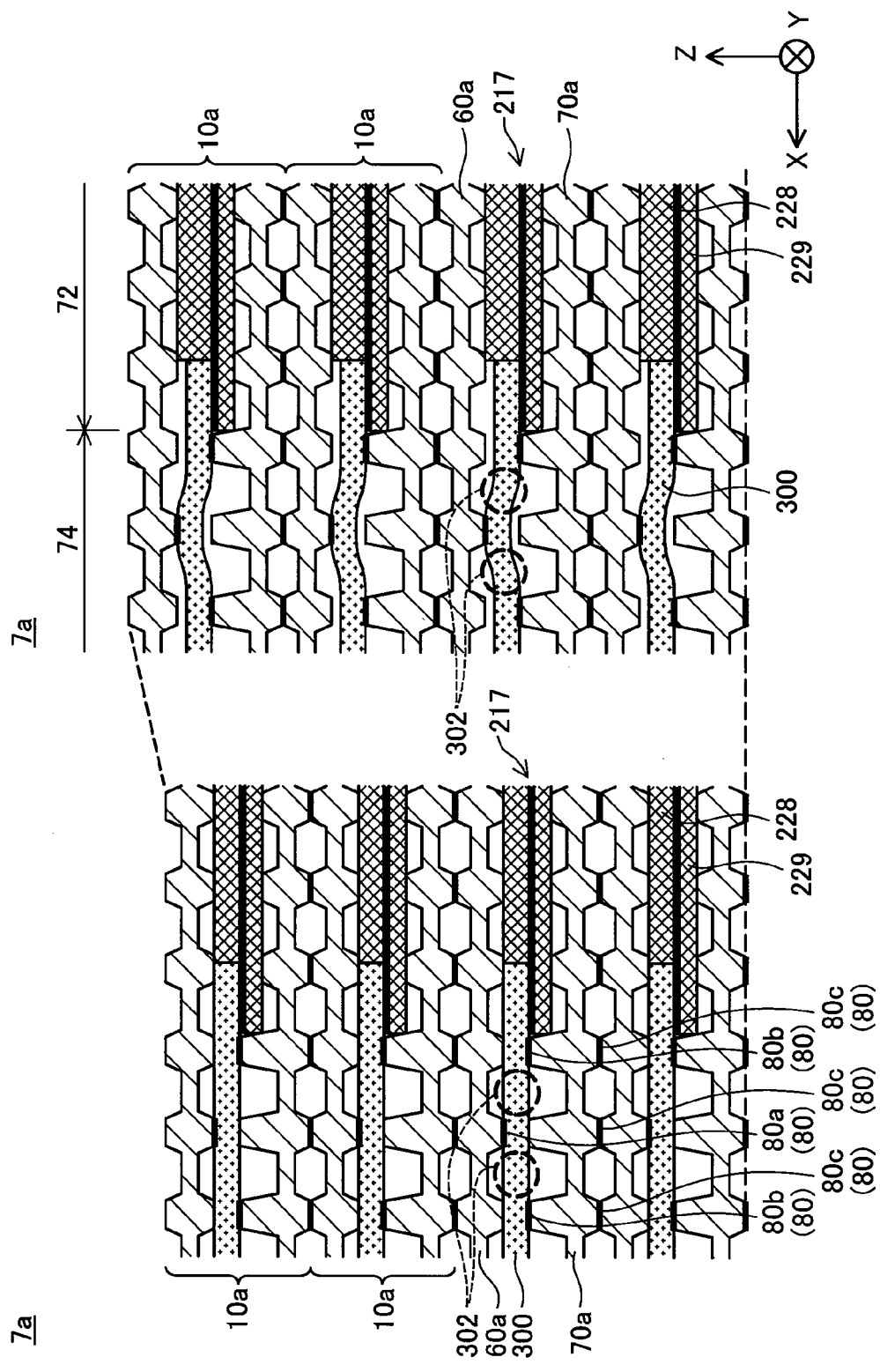
FIG. 8 is diagrams illustrating a second embodiment.

FIG. 8 is diagrams illustrating a second embodiment. The diagrams of FIG. 8 correspond to the diagrams of FIG. 5. In a cell module 7a shown in FIG. 8, first and second separators 60a and 70a of each unit cell 10a have concavo-convex surface geometries. The concavities and the convexities on the surface form flow paths of the reactive gases and the cooling medium. The first and the second separators 60a and 70a may be made of, for example, a composite material of carbon particles and a resin or a material obtained by additionally mixing metal particles with the composite material. Otherwise the structure is similar to the structure of the first embodiment. The like components are expressed by the like symbols and are not specifically described here.

In the cell module 7a shown in FIG. 8, the respective unit cells 10a have the first bonding pattern. More specifically, when the unit cell 10a is viewed along the stacking direction (Z-axis direction) of the unit cells 10a, a first bonding area 80a and a second bonding area 80b are formed at positions that do not overlap with each other but are shifted from each other. This forms a deformation area 302. A third bonding area 80c is formed by bonding the entire contact surfaces of the adjacent separators 60a and 70a to each other. Accordingly, the third bonding area 80c overlaps with both the first bonding area 80a and the second bonding area 80b.

As shown in the right diagram of FIG. 8, when the cell module 7a is in no loading state, the thickness (length along the stacking direction) of the center area 72 of the cell module 7a increases. Part of the peripheral area 74 where the deformation area 302 of the resin frame 300 is located has a bowed and bent shape in the stacking direction. The shape of the resin frame 300 is changed between the state that a compressive load is applied in the stacking direction and the state that the compressive load is released as described above, so that the thickness of the peripheral area 74 is increased with an increase in thickness of the center area 72. This suppresses the cell module 7a from being excessively deformed in a drum-like shape. This results in reducing the likelihood of a damage such as cracking of the cell module 7a by, for example, stress concentration.

C. Third Embodiment

Figure 9:
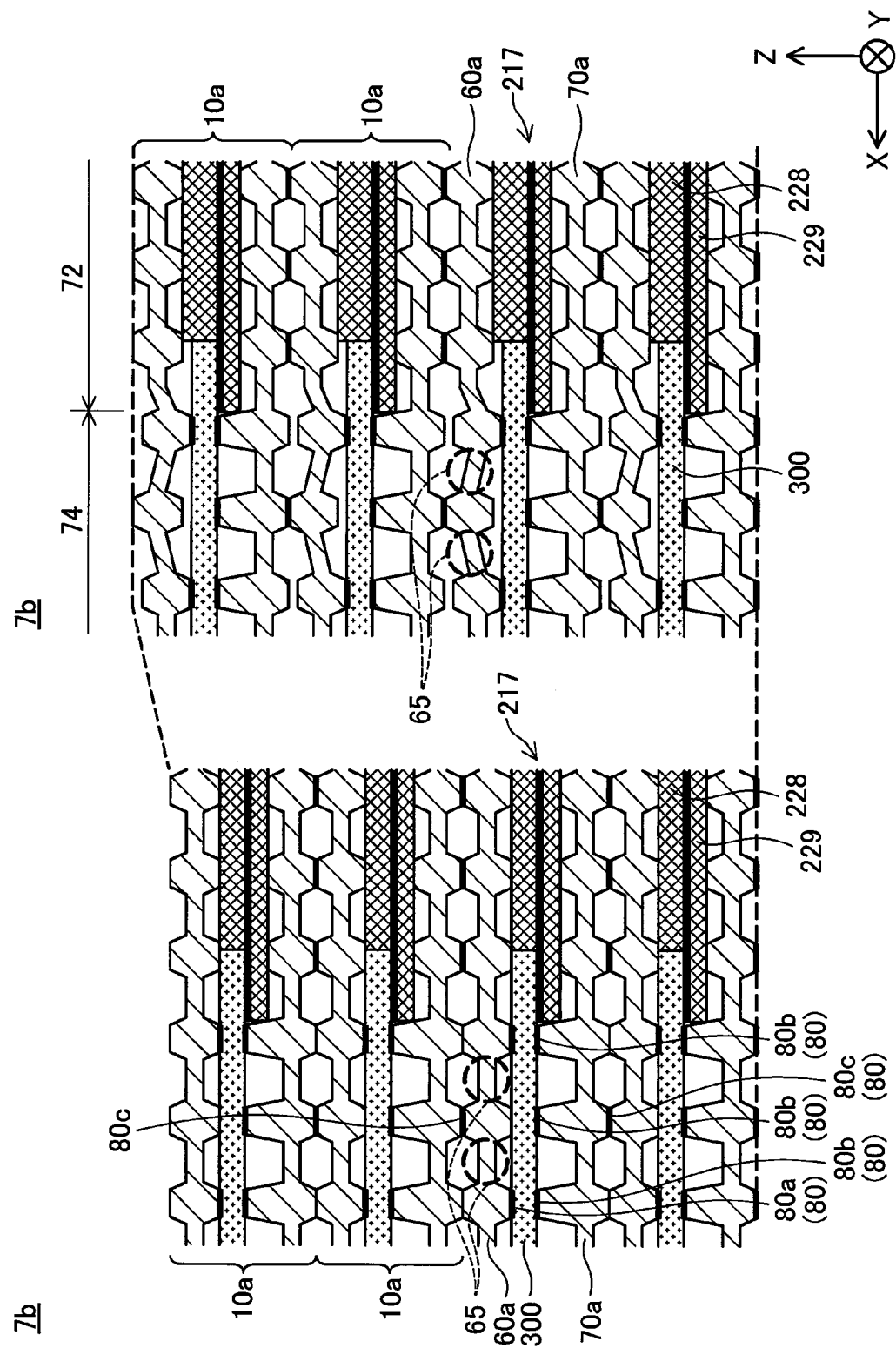
FIG. 9 is diagrams illustrating a third embodiment.

FIG. 9 is diagrams illustrating a third embodiment. The diagrams of FIG. 9 correspond to the diagrams of FIG. 5. A cell module 7b of the third embodiment differs from the cell module 7a of the second embodiment by only the bonding pattern. Otherwise the structure is similar to the structure of the second embodiment. The like components are expressed by the like symbols and are not specifically described here.

In the cell module 7b, the respective unit cells 10a have the second bonding pattern. According to the third embodiment, the second bonding pattern is formed by arranging the bonding areas 80 as described below. When each of the unit cells 10a is viewed in the stacking direction of the unit cells 10a, a third bonding area 80c formed by bonding the adjacent unit cells 10a to each other is arranged at a position that does not overlap with the positions of first and second bonding areas 80a and 80b and is shifted from the positions of the first and the second bonding areas 80a and 80b. This forms a deformation area 65.

As shown in the right diagram of FIG. 9, when the cell module 7b is in no loading state, the thickness (length along the stacking direction) of the center area 72 of the cell module 7b increases. Part of the peripheral area 74 where the deformation area 65 of the first separator 60a is located has a bowed and bent shape in the stacking direction. The shape of the first separator 60a is changed between the state that a compressive load is applied in the stacking direction and the state that the compressive load is released as described above, so that the thickness of the peripheral area 74 is increased with an increase in thickness of the center area 72. This suppresses the cell module 7b from being excessively deformed in a drum-like shape. This results in reducing the likelihood of a damage such as cracking of the cell module 7b by, for example, stress concentration.

D. Fourth Embodiment

Figure 10:
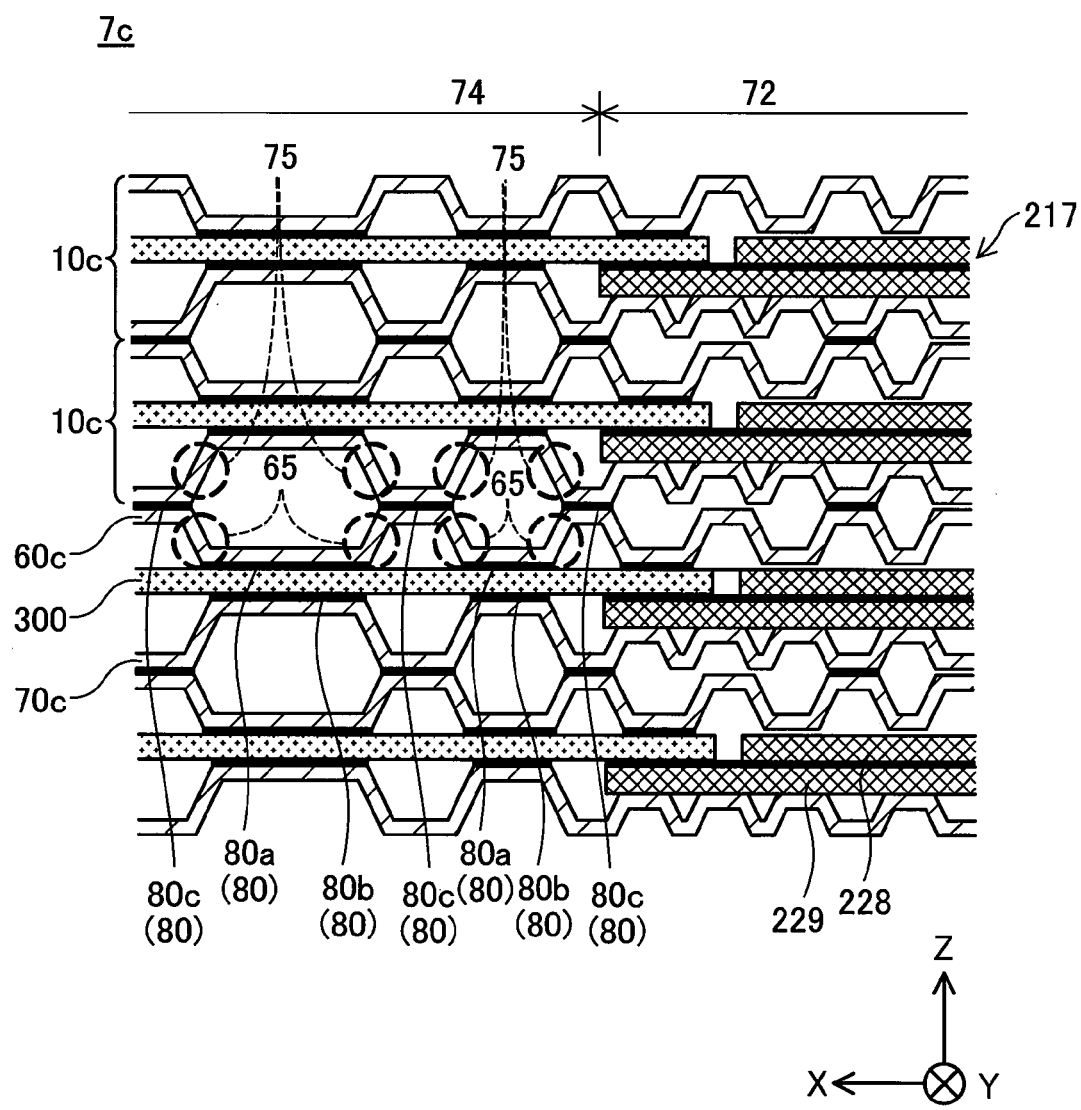
FIG. 10 is a diagram illustrating a fourth embodiment.

FIG. 10 is a diagram illustrating a fourth embodiment. The diagram of FIG. 10 corresponds to the diagram of FIG. 5. FIG. 10 shows a cell module 7c in no loading state. The cell module 7c of the fourth embodiment differs from the cell module 7b of the third embodiment by only the structures of first and second separators 60c and 70c. Otherwise the structure is similar to the structure of the third embodiment. The like components are expressed by the like symbols to those of the third embodiment and are not specifically described here.

In the cell module 7c, the first and the second separators 60c and 70c of the unit cell 10c are members formed by pressing a flat metal plate. More specifically, each of the first and the second separators 60c and 70c has portions convex in a first direction (positive Z-axis direction) and portions convex in a second direction (negative Z-axis direction). These concavities the convexities form flow paths of the reactive gases and the cooling medium. The metal material used for formation of the first and the second separators 60c and 70c may be, for example, stainless steel. The first and the second separators 60c and 70c have flexibility.

The respective unit cells 10c of the cell module 7c have the second bonding pattern. More specifically, when the unit cell 10c is viewed along the stacking direction (Z-axis direction) of the unit cells 10c, with respect to at least one of the first and the second separators 60c and 70c, a third bonding area 80c formed on one surface is arranged at a position that does not overlap with but is shifted from the position of either a first bonding area 80a or a second bonding area 80b formed on the other surface. According to this embodiment, in each of the unit cells 10c, the first and the second bonding areas 80a and 80b are formed at positions that overlap with each other, and the third bonding area 80c is formed at a position that does not overlap with but is shifted from the positions of the first and the second bonding areas 80a and 80b. This forms deformation areas 65 and 75. The deformation areas 65 and 75 bowed and bent in the stacking direction enables the thickness of the peripheral area 74 to be changed with a change in thickness of the center area 72. This suppresses the cell module 7c from being excessively deformed in a drum-like shape. This results in reducing the likelihood of a damage such as cracking of the cell module 7c by, for example, stress concentration.

E. Modifications

The invention is not limited to any of the embodiments described herein but may include a diversity of modifications. For example, the above embodiments are described in detail for the purpose of facilitating understanding of the invention and may not be necessarily limited to the configurations including all the components described above. Part of the configuration of a certain embodiment may be replaced with the configuration of another embodiment. The configuration of another embodiment may be added to the configuration of a certain embodiment. Part of the configuration of each of the embodiments may have addition of another configuration, may be deleted or may be replaced with another configuration.

E1. Modification 1

In the embodiments described above, all the unit cells 10 (10a, 10c) included in the cell module 7 (7a, 7b, 7c) have either the first bonding pattern or the second bonding pattern. The requirement is, however, that at least one of the unit cells 10 (10a, 10c) may have either the first bonding pattern or the second bonding pattern. This arrangement enables the unit cell 10 (10a, 10c) of the cell module 7 (7a, 7b, 7c) having the first bonding pattern or the second bonding pattern to have a deformation area. This enables the peripheral area 74 to be deformed associated with deformation of the center area 72 and suppresses the cell module 7 (7a, 7b, 7c) from being excessively deformed in a drum-like shape.

The cell module 7 (7a, 7b, 7c) may have both the first bonding pattern and the second bonding pattern. This arrangement also suppresses the cell module 7 (7a, 7b, 7c) from being excessively deformed in a drum-like shape.

One unit cell 10 (10a, 10c) out of the plurality of unit cells 10 (10a, 10c) included in the cell module 7 (7a, 7b, 7c) may have both the first bonding pattern and the second bonding pattern. This arrangement also suppresses the cell module 7 (7a, 7b, 7c) from being excessively deformed in a drum-like shape.

E2. Modification 2

The predetermined bonding pattern is not limited to the first and the second bonding patterns. For example, in another example of the predetermined bonding pattern, when the unit cell 10 (10a,10c) is viewed along the stacking direction (Z-axis direction), the first to the third bonding areas 80a to 80c may be formed at positions that do not overlap with one another but are shifted from one another. This arrangement also suppresses the cell module 7 (7a, 7b, 7c) from being excessively deformed in a drum-like shape.

E3. Modification 3

The above embodiments may employ the following aspects:

Aspect 1:

There is a cell module, comprising a plurality of unit cells that are stacked. The unit cell comprises: an electrode body including a membrane electrode assembly and a pair of gas diffusion layers placed on respective surfaces of the membrane electrode assembly; a frame placed along an outer periphery of the electrode body to surround the electrode body; a first separator and a second separator bonded to the frame such as to have the electrode body and the frame placed therebetween, wherein the first separator is located on one side of the membrane electrode assembly and the second separator is located on the other side of the membrane electrode assembly; and a first bonding area provided as an area where the first separator and the frame are bonded to each other, a second bonding area provided as an area where the second separator and the frame are bonded to each other and a third bonding area provided as an area where separators included in adjacent unit cells are bonded to each other. With respect to at least one unit cell out of the plurality of unit cells, when the at least one unit cell is viewed along a stacking direction of the plurality of unit cells, at least one bonding area out of the first to the third bonding areas is formed at a position that does not overlap with position of another bonding area. The at least one unit cell has a first bonding pattern. In the first bonding pattern, when the at least one unit cell is viewed along the stacking direction, the first bonding area and the second bonding area are formed at positions that do not overlap with each other. The first bonding area and the third bonding area are arranged to at least partly overlap with each other, and the second bonding area and the third bonding area are arranged to at least partly overlap with each other.

Aspect 2:

There is a cell module, comprising a plurality of unit cells that are stacked. The unit cell comprises: an electrode body including a membrane electrode assembly and a pair of gas diffusion layers placed on respective surfaces of the membrane electrode assembly; a frame placed along an outer periphery of the electrode body to surround the electrode body; a first separator and a second separator bonded to the frame such as to have the electrode body and the frame placed therebetween, wherein the first separator is located on one side of the membrane electrode assembly and the second separator is located on the other side of the membrane electrode assembly; and a first bonding area provided as an area where the first separator and the frame are bonded to each other, a second bonding area provided as an area where the second separator and the frame are bonded to each other and a third bonding area provided as an area where separators included in adjacent unit cells are bonded to each other. With respect to at least one unit cell out of the plurality of unit cells, when the at least one unit cell is viewed along a stacking direction of the plurality of unit cells, at least one bonding area out of the first to the third bonding areas is formed at a position that does not overlap with position of another bonding area. The at least one unit cell has a second bonding pattern. In the second bonding pattern, when the at least one unit cell is viewed along the stacking direction, the first bonding area and the second bonding area have an at least partly overlapped area. The overlapped area and the third bonding area are formed at positions that do not overlap with each other.

REFERENCE SIGNS LIST

5 fuel cell system
7 to 7c cell modules
10 to 10c unit cells
16 gasket
21 end plate
22 insulating plate
23 current collector
24 tension rod
25 nut
26 controller
27 actuator
40 air compressor
41 oxidizing gas supply path
43 cooling medium circulation path
45 radiator
47 cooling medium circulation path
48 cathode off gas passage
50 hydrogen tank
51 pressure reducing valve
52 pressure regulator
53 hydrogen gas supply path 54 anode off gas passage
60 to 60c first separators
65 deformation area
70 to 70c second separators
72 center area
74 peripheral area
75 deformation area
80 bonding area
80a first bonding area
80b second bonding area
80c third bonding area
200 fuel cell stack
200e outer periphery
200g power generation area
210 electrolyte membrane
215 membrane electrode assembly
217 electrode body
221 cathode
222 anode
228 cathode diffusion layer
229 anode diffusion layer
300 resin frame
302 deformation area
310 opening
321, 322, 331, 332 through holes
332a groove path
332b groove path
341, 342, 421, 422 through holes
422t groove path
431, 432, 441, 442 through holes
442t groove path
461Ca groove path
461an groove path
462 groove path
M1 to M6 manifolds

What is claimed is:

1. A cell module, comprising a plurality of unit cells that are stacked,
the unit cell comprising:
an electrode body including a membrane electrode assembly and a pair of gas diffusion layers placed on each surface of the membrane electrode assembly;
a frame placed along an outer periphery of the electrode body to surround the electrode body;
a first separator and a second separator bonded to the frame such as to have the electrode body and the frame placed therebetween, wherein the first separator is located on one side of the membrane electrode assembly and the second separator is located on the other side of the membrane electrode assembly; and
a first bonding area provided as an area where the first separator and the frame are bonded to each other, a second bonding area provided as an area where the second separator and the frame are bonded to each other and a third bonding area provided as an area where separators included in adjacent unit cells are bonded to each other, wherein
with respect to at least one unit cell out of the plurality of unit cells, when the at least one unit cell is viewed along a stacking direction of the plurality of unit cells, at least one bonding area out of the first to the third bonding areas of the unit cell is formed at a position that does not overlap with another bonding area of the unit cell,
wherein the at least one unit cell has a first bonding pattern, and
in the first bonding pattern, when the at least one unit cell is viewed along the stacking direction, the first bonding area and the second bonding area are formed at positions that do not overlap with each other.

2. The cell module according to claim 1,
wherein the at least one unit cell has a second bonding pattern, and
in the second bonding pattern, when the at least one unit cell is viewed along the stacking direction, with respect to at least one of the first and the second separators, the third bonding area formed on one surface is arranged at a position that does not overlap with either the first bonding area or the second bonding area formed on the other surface.

3. The cell module according to claim 1,
wherein the first separator and the second separator are metal plates.

4. The cell module according to claim 1,
wherein the first separator and the second separator are made of a composite material of carbon particles and a resin or a material obtained by additionally mixing metal particles with the composite material.

5. A cell module, comprising a plurality of unit cells that are stacked,
the unit cell comprising:
an electrode body including a membrane electrode assembly and a pair of gas diffusion layers placed on each surface of the membrane electrode assembly;
a frame placed along an outer periphery of the electrode body to surround the electrode body;
a first separator and a second separator bonded to the frame such as to have the electrode body and the frame placed therebetween, wherein the first separator is located on one side of the membrane electrode assembly and the second separator is located on the other side of the membrane electrode assembly; and
a first bonding area provided as an area where the first separator and the frame are bonded to each other, a second bonding area provided as an area where the second separator and the frame are bonded to each other and a third bonding area provided as an area where separators included in adjacent unit cells are bonded to each other, wherein
with respect to at least one unit cell out of the plurality of unit cells, when the at least one unit cell is viewed along a stacking direction of the plurality of unit cells, at least one bonding area out of the first to the third bonding areas of the unit cell is formed at a position that does not overlap with another bonding area of the unit cell,
wherein the first separator and the second separator are made of a composite material of carbon particles and a resin or a material obtained by additionally mixing metal particles with the composite material.

6. The cell module according to claim 5,
wherein the at least one unit cell has a first bonding pattern, and
in the first bonding pattern, when the at least one unit cell is viewed along the stacking direction, the first bonding area and the second bonding area are formed at positions that do not overlap with each other.

7. The cell module according to claim 5,
wherein the at least one unit cell has a second bonding pattern, and
in the second bonding pattern, when the at least one unit cell is viewed along the stacking direction, with respect to at least one of the first and the second separators, the third bonding area formed on one surface is arranged at a position that does not overlap with either the first bonding area or the second bonding area formed on the other surface.

8. A fuel cell stack, comprising:
a plurality of the cell modules according to claim 1, wherein
the plurality of the cell modules are stacked in the stacking direction.

9. A fuel cell stack, comprising:
a plurality of the cell modules according to claim 5, wherein
the plurality of the cell modules are stacked in the stacking direction.

10. A cell module according to claim 1, wherein
when the at least one unit cell is viewed along a stacking direction of the plurality of unit cells, the frame includes a deformation area in which the first separator and the second separator are not bonded to the frame,
when a center area of the cell module in which the pair of gas diffusion layers is located expands outward along the stacking direction, the deformation area has a bowed and bent shape in the stacking direction.

11. A cell module according to claim 5, wherein
at least one of the first separator, the second separator, and the frame include a deformation area,
when a center area of the cell module in which the pair of gas diffusion layers is located expands outward along the stacking direction, the deformation area has a bowed and bent shape in the stacking direction.

* * * * *